US011423789B2

(12) United States Patent
Svatek et al.

(10) Patent No.: US 11,423,789 B2
(45) Date of Patent: Aug. 23, 2022

(54) SYSTEM AND METHOD FOR PREVENTING INADVERTENT LOSS OF COMMAND AND CONTROL LINK TO AN UNMANNED AERIAL SYSTEM

(71) Applicant: Rockwell Collins, Inc., Cedar Rapids, IA (US)

(72) Inventors: Boe A. Svatek, Cedar Rapids, IA (US); Nicholas Liberko, Marion, IA (US); Brian R. Wolford, Cedar Rapids, IA (US); Daniel Snodgrass, Palo, IA (US); Jason Thompson, Vinton, IA (US); Kevin McElroy, Vint Hill Farms, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 221 days.

(21) Appl. No.: 16/704,742

(22) Filed: Dec. 5, 2019

(65) Prior Publication Data

US 2022/0230548 A1    Jul. 21, 2022

(51) Int. Cl.
*G08G 5/00* (2006.01)
*G05D 1/00* (2006.01)

(52) U.S. Cl.
CPC ......... *G08G 5/0069* (2013.01); *G05D 1/0022* (2013.01); *G08G 5/0013* (2013.01);
(Continued)

(58) Field of Classification Search
CPC .. G08G 5/0013; G08G 5/0021; G08G 5/0026; G08G 5/0052; G08G 5/0069
See application file for complete search history.

(56) References Cited

U.S. PATENT DOCUMENTS

| 5,111,400 A | 5/1992 | Yoder |
| 6,044,323 A | 3/2000 | Yee et al. |
| (Continued) | | |

FOREIGN PATENT DOCUMENTS

| GB | 2569789 A | 7/2019 |
| WO | 2018178759 A1 | 10/2018 |

OTHER PUBLICATIONS

Extended Search Report for European Application No. 20212277.6 dated Apr. 29, 2021, 5 pages.

*Primary Examiner* — Andrew W Bee
(74) *Attorney, Agent, or Firm* — Suiter Swantz pc llo (57) ABSTRACT

An unmanned aerial system (UAS) is disclosed. In embodiments, the UAS includes an unmanned aerial vehicle (UAV), and a controller communicatively coupled to the UAV. In embodiments, the UAS controller may be configured to: acquire a command and control (C2) link quality model for a planned route; generate one or more control signals configured to cause the UAV to perform a monitored flight along a planned route; acquire actual C2 link quality data during the monitored flight along the planned route; compare the actual C2 link quality data to the C2 link quality model; identify a C2 link quality deviation between the actual C2 link quality and the C2 link quality model; and generate one or more control signals configured to cause the UAV to perform one or more prescribed flight plan maneuvers if the identified C2 link quality deviation ($\Delta C2_{LQ}$) exceeds a threshold deviation value ($C2_{thresh}$).

15 Claims, 6 Drawing Sheets

(52) U.S. Cl.
CPC ......... *G08G 5/0021* (2013.01); *G08G 5/0026* (2013.01); *G08G 5/0052* (2013.01)

(56) References Cited

U.S. PATENT DOCUMENTS

| | | | |
|---|---|---|---|
| 8,600,602 B1 | 12/2013 | McAndrew et al. | |
| 8,798,922 B2 | 8/2014 | Tillotson et al. | |
| 9,273,981 B1 | 3/2016 | Downey et al. | |
| 9,715,235 B2 | 7/2017 | McGrew et al. | |
| 10,049,590 B2 | 8/2018 | Thiele et al. | |
| 10,421,543 B2 | 9/2019 | Liu et al. | |
| 10,438,494 B1 | 10/2019 | Hahn | |
| 10,466,700 B1 * | 11/2019 | Carmack | H04K 3/224 |
| 10,656,643 B1 | 5/2020 | Bertram et al. | |
| 2011/0231036 A1 | 9/2011 | Yogesha et al. | |
| 2015/0197010 A1 | 7/2015 | Ruuspakka et al. | |
| 2015/0339932 A1 | 11/2015 | Ramanna et al. | |
| 2016/0232795 A1 | 8/2016 | Thiele et al. | |
| 2017/0108866 A1 | 4/2017 | Quinn | |
| 2018/0267532 A1 * | 9/2018 | Li | G05D 1/0011 |
| 2019/0043368 A1 * | 2/2019 | Priest | G08G 5/0069 |
| 2019/0265705 A1 | 8/2019 | Zhang et al. | |
| 2019/0315462 A1 | 10/2019 | Skladman et al. | |
| 2019/0315482 A1 | 10/2019 | Gu et al. | |
| 2020/0394927 A1 * | 12/2020 | Neubauer | G08G 5/0013 |
| 2021/0053680 A1 * | 2/2021 | Prest | G05D 1/0055 |
| 2021/0159971 A1 * | 5/2021 | Panchal | H04B 7/1855 |

* cited by examiner

SYSTEM AND METHOD FOR PREVENTING INADVERTENT LOSS OF COMMAND AND CONTROL LINK TO AN UNMANNED AERIAL SYSTEM

BACKGROUND

Operating unmanned aerial vehicles (UAVs) beyond visual line of sight (BVLOS) requires robust command and control (C2) data links with the UAVs in order to ensure positive control of the UAVs. Maintaining a C2 link in an unmanned aerial system (UAS) is critical to mission success, aircraft safety, and community safety. The ever-increasing use of drones and other UAVs amplifies the need to prevent loss of C2 links in order to ensure safe operation of the UAVs, prevent property damage, and prevent human injury. Current UAS systems utilize methods which trigger UAVs to perform prescribed maneuvers (e.g., pre-programmed flight plans) after a C2 link has been lost. However, these prescribed maneuvers only take place after total loss of the C2 link. Therefore, it would be desirable to provide a system and method which cure one or more of the shortfalls of the previous approaches identified above.

SUMMARY

An unmanned aerial system (UAS) is disclosed. In embodiments, the UAS includes an unmanned aerial vehicle (UAV), and a controller communicatively coupled to the UAV. In embodiments, the UAS controller may be configured to: acquire a command and control (C2) link quality model for a planned route; generate one or more control signals configured to cause the UAV to perform a monitored flight along a planned route; acquire actual C2 link quality data during the monitored flight along the planned route; compare the actual C2 link quality data to the C2 link quality model; identify a C2 link quality deviation between the actual C2 link quality and the C2 link quality model; and generate one or more control signals configured to cause the UAV to perform one or more prescribed flight plan maneuvers if the identified C2 link quality deviation ($\Delta C2_{LQ}$) exceeds a threshold deviation value ($C2_{thresh}$).

In some embodiments of the unmanned aerial system, the controller is positioned onboard the UAV.

In some embodiments of the UAS, the controller includes a remote UAS controller wirelessly coupled to the UAV.

In some embodiments of the UAS, the one or more prescribed flight plan maneuvers are performed in order to prevent total loss of C2 link connectivity between the UAV and the UAS controller.

In some embodiments of the UAS, the C2 link quality model includes a plurality of anticipated C2 link quality metrics associated with a plurality of positions along the planned route.

In some embodiments of the UAS, acquiring a command and control (C2) link quality model for a planned route includes generating the C2 link quality model based on historical C2 link quality data along the planned route.

In some embodiments of the UAS, acquiring a C2 link quality model based on historical C2 link quality data along the planned route includes: performing one or more flights along the planned route; acquiring actual C2 link quality data during the one or more flights along the planned route; and generating the C2 link quality model based on the acquired actual C2 link quality data.

In some embodiments of the UAS, acquiring a C2 link quality model for a planned route further includes: collecting the historical C2 link quality data along the planned route; generating an initial C2 link quality model based on the historical C2 link quality data; and selectively adjusting the initial C2 link quality model based on one or more anticipated conditions during the monitored flight to generate the C2 link quality model. In embodiments, the one or more anticipated conditions may include noise along the planned route, traffic along the planned route, or weather conditions along the planned route.

In some embodiments of the UAS, the one or more prescribed flight plan maneuvers include at least one of a backtracking maneuver, a homing maneuver, or a hover-and-hold maneuver.

In some embodiments of the UAS, the one or more prescribed flight plan maneuvers include a hover-and-hold maneuver, and the UAS controller is further configured to: determine, at a time subsequent to performing the hover-and-hold maneuver, that the identified C2 link quality deviation ($\Delta C2_{LQ}$) is less than the threshold deviation value ($C2_{thresh}$); and transmit one or more control signals to the UAV, the one or more control signals configured to cause the UAV to terminate the hover-and-hold maneuver and continue along the planned route.

In some embodiments of the UAS, the UAS controller is further configured to adaptively modify one or more characteristics of the planned route based on the identified C2 link quality deviation ($\Delta C2_{LQ}$).

In some embodiments of the UAS, the UAS further includes at least one additional UAV communicatively coupled to the UAS controller.

In some embodiments of the UAS, wherein the UAS controller is further configured to: transmit one or more control signals to the at least one additional UAV in response to the identified C2 link quality deviation ($\Delta C2_{LQ}$), wherein the one or more control signals are configured to cause the at least one additional UAV to selectively adjust one or more characteristics of the at least one additional UAV based on the identified C2 link quality deviation ($\Delta C2_{LQ}$).

In some embodiments of the UAS, the one or more characteristics of the at least one additional UAV include at least one of a position of the at least one additional UAV or a planned route of the at least one additional UAV.

A method of operating an unmanned aerial vehicle (UAV) is disclosed. In embodiments, the method includes: generating a command and control (C2) link quality model for a planned route; acquiring actual C2 link quality data during a monitored flight of the UAV along the planned route; comparing the actual C2 link quality data to the C2 link quality model; identifying a C2 link quality deviation ($\Delta C2_{LQ}$) between the actual C2 link quality data and the C2 link quality model; and performing one or more prescribed flight plan maneuvers if the identified C2 link quality deviation ($\Delta C2_{LQ}$) exceeds a threshold deviation value ($C2_{thresh}$).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Operating unmanned aerial vehicles (UAVs) beyond visual line of sight (BVLOS) requires robust command and control (C2) data links with the UAVs in order to ensure positive control of the UAVs. Maintaining a C2 link in an unmanned aerial system (UAS) is critical to mission success, aircraft safety, and community safety. The ever-increasing use of drones and other UAVs amplifies the need to prevent loss of C2 links in order to ensure safe operation of the UAVs, prevent property damage, and prevent human injury.

Current UAS systems are able to monitor C2 link quality during flights, and utilize methods which trigger UAVs to perform prescribed maneuvers (e.g., pre-programmed flight plans) after a C2 link has been lost. However, these prescribed maneuvers (e.g., return to home base) are typically performed without regard to re-gaining and/or maintaining a C2 link, and only take place after total loss of the C2 link. Furthermore, current UAS systems are not able to prevent a UAV from unintentionally departing an area of known sufficient C2 link coverage. Accordingly, current UAS systems are able to take measures after complete loss of a C2 link, but are unable to prevent the loss of the C2 link in the first place.

Accordingly, embodiments of the present disclosure are directed to a system and method which cure one or more of the shortfalls of the previous approaches identified above. Embodiments of the present disclosure are directed to an unmanned aerial system (UAS) which is configured to determine expected C2 link coverage for UAVs, and prevent UAVs from departing from areas of expected and sufficient C2 link coverage. More particularly, embodiments of the present disclosure are directed to a UAS and related method for determining expected C2 link quality model, and comparing actual C2 link quality to the expected C2 link quality model to prevent loss of C2 link connectivity. Additional embodiments of the present disclosure are directed to a system and method for performing prescribed flight plan maneuvers in order to prevent loss of C2 link connectivity.

It is contemplated herein that embodiments of the present disclosure may enable safer, more responsible beyond visual line of sight (BVLOS) operations of UAVs. By preventing C2 link loss, embodiments of the present disclosure may enable more sophisticated, safe, and reliable unmanned aerial systems.

Figure 1:
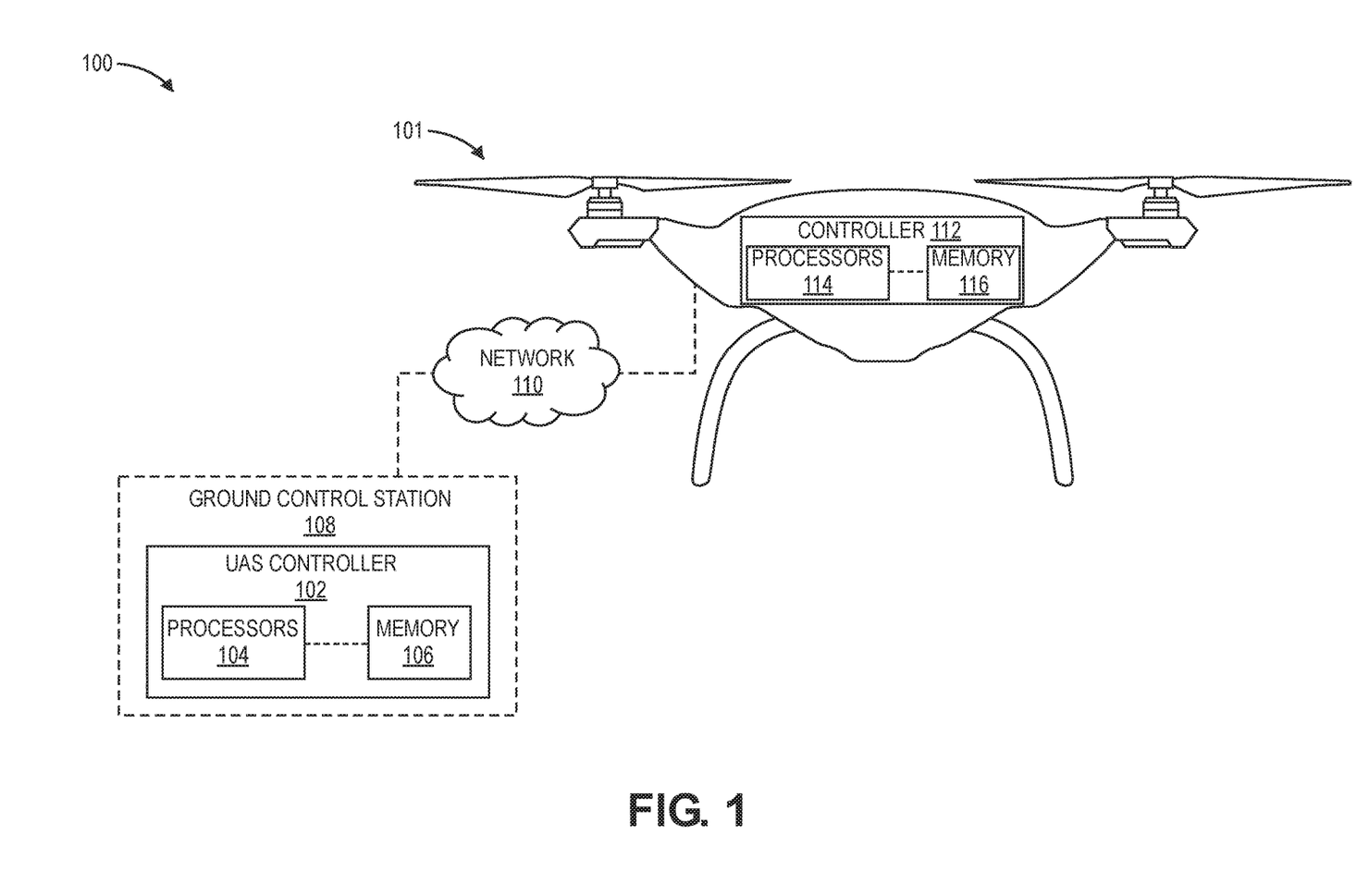
FIG. 1 illustrates a simplified block diagram view of an unmanned aerial system (UAS), in accordance with one or more embodiments of the present disclosure.

FIG. 1 illustrates a simplified block diagram view of an unmanned aerial system (UAS 100), in accordance with one or more embodiments of the present disclosure. The UAS 100 may include, but is not limited to, a UAS controller 102, a network 110, and one or more unmanned aerial vehicles (UAVs 101).

In embodiments, the UAS 100 may include a UAS controller 102 communicatively coupled to one or more UAVs 101 via a network 110. In embodiments, the UAS controller 102 may be positioned remotely with respect to the one or more UAVs 101. For example, as shown in FIG. 1, the UAS controller 102 may be positioned within a ground control station 108 such that the UAS controller 102 is wirelessly communicatively coupled to the one or more UAVs 101 via the network 110. It is noted herein, however, the ground control station 108 is provided solely for illustrative purposes, and is not to be regarded as a limitation of the present disclosure, unless noted otherwise herein. In this regard, it is contemplated herein that the UAS controller 102 may be positioned within any ground control station 108, operation center, mobile control station, airborne control station, or the like. By way of another example, the UAS controller 102 may include a mobile device including, but not limited to, hand-held user interface, tablet, smart phone, and the like.

The UAS controller 102 may include one or more processors 104 and a memory 106. The one or more processors 104 may be configured to execute a set of program instructions stored in memory 106, the set of program instructions configured to cause the one or more processors 104 to carry out various steps/functions of the present disclosure. For example, as will be described in further detail herein, the one or more processors 104 of the UAS controller 102 may be configured to maintain command and control (C2) over the one or more UAVs 101. In this regard, one or more processors 104 of the UAS controller 102 may be configured to generate one or more control signals configured to cause the UAVs 101 to perform various tasks, functions, and/or prescribed flight plan maneuvers.

The UAS controller 102 may be communicatively coupled to the one or more UAVs 101 in any manner known in the art. For example, the UAS controller 102 may be directly coupled to the UAVs 101 such that signals may be transmitted directly between the UAVs 101 and the UAS controller 102. By way of another example, the UAS controller 102 may be communicatively coupled to the one or more UAVs 101 via a network 110. In embodiments where the UAS 100 includes a network 110, the UAS controller 102 and UAVs 101 may each include network interface circuitry configured to interface with the network 110. As will be described in further detail herein, the network 110 may include any network 110 known in the art. For example, the network 110 may include, but is not limited to, a network of terrestrial communication nodes (e.g., communication towers), a network of mobile communication nodes (e.g., mobile terrestrial communication nodes, mobile airborne communication nodes), and the like.

It is further noted herein that the UAS controller 102 and UAVs 101 may be directly and/or indirectly (via network 110) communicatively coupled to one another via any communication protocols known in the art including, but not limited to, GSM, GPRS, CDMA, EV-DO, EDGE, WiMAX, 3G, 4G, 4G LTE, 5G, WiFi protocols, radio frequency (RF), LoRa, and the like. For example, the UAS controller 102 and UAVs 101 may transmit data between each other, directly and/or via network 110, utilizing the L-band or C-band. For instance, the UAS 100 may transmit data between the various component of the UAS 100 utilizing signals in the range of 450 mHz-5 GHz. It is noted herein that signals transmitted within UAS 100 may utilize any frequency or range of frequencies known in the art.

The one or more UAVs 101 may include any unmanned aerial vehicle known in the art including, but not limited to, civilian drones, commercial drones, military drones, transport drones, and the like. In embodiments, the UAVs 101 may include a controller 112. The controller 112 of the UAV 101 may include one or more processors 114 and a memory 116. The one or more processors 114 may be configured to execute a set of program instructions stored in memory 116, the set of program instructions configured to cause the one or more processors 114 to carry out various steps/functions of the present disclosure. For example, the controller 112 may be configured to receive control commands from the UAS controller 102, and perform one or more tasks, functions, or flight maneuvers in response to the received control commands.

It is noted herein that various steps/functions of the present disclosure may be performed by the UAS controller 102 and/or the controller 112, unless noted otherwise herein. In this regard, various steps/functions carried out within the UAS 100 may be agnostic with respect to the physical location that those steps/functions are carried out, unless noted otherwise herein. Accordingly, various steps/functions carried out by the UAS 100 may be generally described as being carried out by the UAS controller 102 and/or controller 112.

As noted previously herein, the UAS controller 102/controller 112 may include one or more processors 104, 114 and a memory 106, 116. The one or more processors 104, 114 may be configured to execute a set of program instructions stored in memory 106, 116, the set of program instructions configured to cause the one or more processors 104, 114 to carry out various steps/functions of the present disclosure. For example, the UAS controller 102/controller 112 may be configured to: acquire a command and control (C2) link quality model for a planned route; generate one or more control signals configured to cause the UAV to perform a monitored flight along a planned route; acquire actual C2 link quality data during the monitored flight along the planned route; compare the actual C2 link quality data to the C2 link quality model; identify a C2 link quality deviation between the actual C2 link quality data and the C2 link quality model; and generate one or more control signals configured to cause the UAV to perform one or more prescribed flight plan maneuvers if the identified C2 link quality deviation exceeds a threshold deviation value. Each of these steps/functions will be addressed in turn.

Figure 2A:
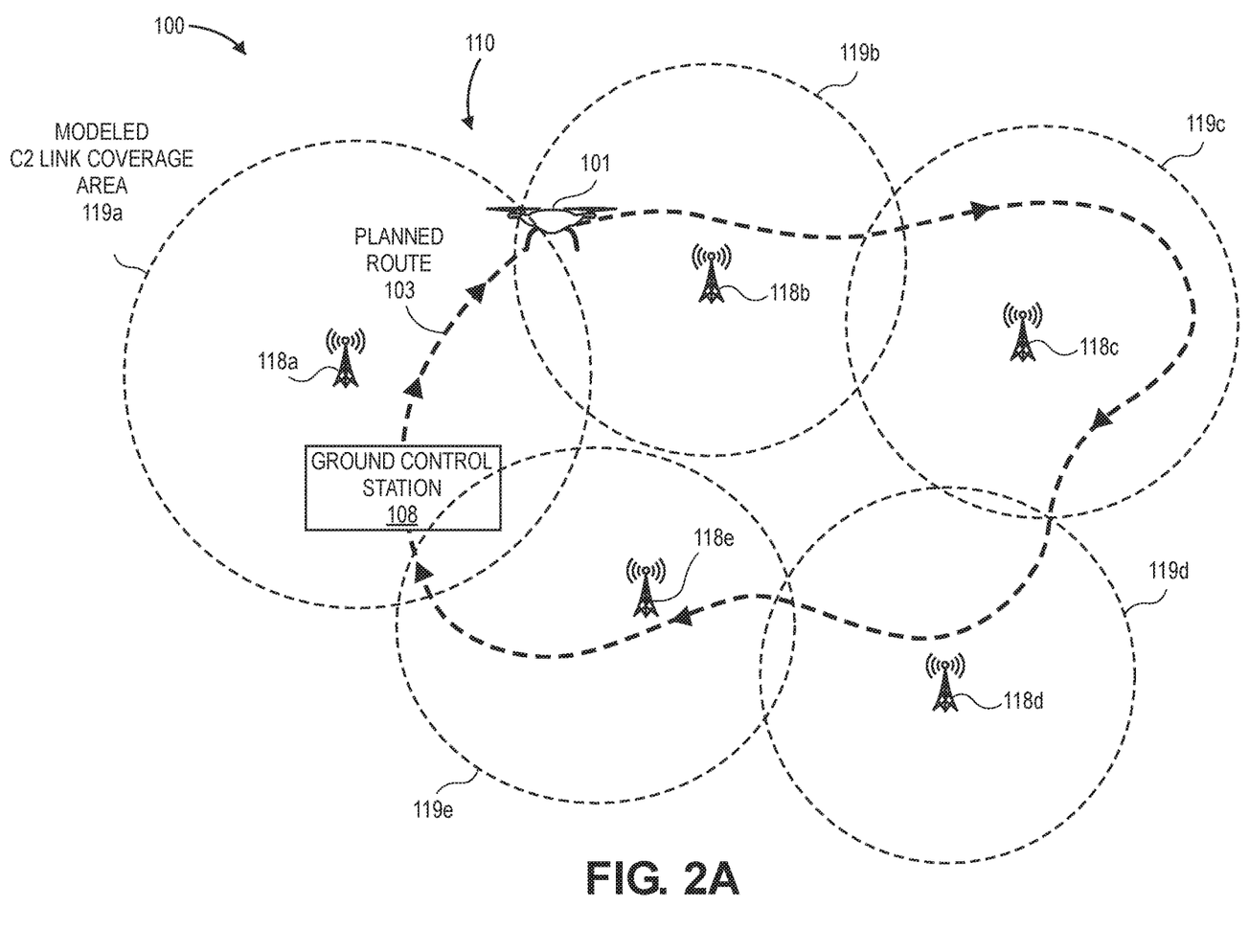
FIG. 2A illustrates a conceptual diagram of an unmanned aerial system (UAS), in accordance with one or more embodiments of the present disclosure.

FIG. 2A illustrates conceptual diagram of an unmanned aerial system (UAS 100), in accordance with one or more embodiments of the present disclosure.

As shown in FIG. 2A, in some embodiments, the network 110 may include a plurality of terrestrial communication nodes 118a-118n (e.g., C2 link towers 118a-118n). A UAS controller 102 configured to maintain a C2 link over a UAV 101 of the UAS 100 may be positioned within the ground control station 108. In cases where the UAV 101 travels BVLOS, the UAS controller 102 may be configured to maintain a C2 link with the UAV 101 via the plurality of terrestrial communication nodes 118a-118n. In this regard, as the UAV 101 travels along a planned route 103, the UAS controller 102 may be configured to maintain a C2 link with the UAV 101 by transmitting signals to the UAV 101 via one or more of the terrestrial communication nodes 118a-118n.

For the purposes of the present disclosure, the term "C2 link," "C2 link connectivity," and like terms, may be used to refer to a communicative coupling between the UAS controller 102 and the UAV 101 which is sufficient for the UAS controller 102 to transmit command and control signals to the UAV 101 (and/or receive data from the UAV 101) with a selected efficiency or reliability.

In embodiments, the UAS controller 102 and/or onboard controller 112 may be configured to acquire a command and control (C2) link quality model for a planned route 103 and/or a geographical area covered by a network 110. A C2 link quality model may include any model known in the art which is configured to map anticipated C2 link quality metrics (e.g., values) with associated positions along a planned route 103 or within a geographical region. In this regard, the C2 link quality model may include a map, chart, database, or the like, which correlates points along the planned route 103 to C2 link quality values/metrics which are expected to be experienced by a UAV 101 at the respective points along the planned route 103 or within a geographical region.

For example, as shown in FIG. 2A, a C2 link quality model may include a modeled C2 link coverage area 119 made up of individual modeled C2 link coverage areas 119a-119n associated with each terrestrial communication node 118a-118n. The modeled C2 link coverage area 119 may indicate a geographical region within which a UAV 101 is expected to maintain sufficient C2 link connectivity. In this example, the modeled C2 link coverage area 119 may cover the entirety of the planned route 103, indicating a UAV 101 is expected to maintain sufficient C2 link quality across the entirety of the planned route 103.

The C2 link quality model may be acquired (e.g., generated, received) via any techniques known in the art. The C2 link quality model may also be generated based on any data known in the art including, but not limited to, historical C2 link quality data along the planned route 103, predictive C2 link quality data, anticipated conditions along the planned route 103, and the like.

For example, the planned route 103 may include a regularly-flown route of the UAS 100. For instance, UAVs 101 may be configured to regularly fly the planned route 103 in order to inspect railways, electrical lines, trails, roads, landscapes, and the like. During one or more flights along the planned route 103, the UAS controller 102 and/or controller 112 may be configured to monitor C2 link performance along the planned route 103. In this regard, the UAS controller 102 and/or controller 112 may be configured to acquire C2 link quality data during the one or more flights along the planned route 103. Collected C2 link performance data may be stored in memory 106, 116. By monitoring C2 link performance and collecting C2 link quality metrics along the planned route 103 during previous flights, the C2 link quality model may be generated based on historical C2 link quality data along the planned route.

For instance, a UAV 101 may have traveled the planned route 103 ten previous times (e.g., ten previous flights). During each of the ten previous flights, the UAS controller 102 and/or controller 112 may have acquired C2 link quality data along the planned route 103. In this example, the C2 link quality data acquired during the previous ten flights may be considered historical C2 link quality data. Subsequently, the historical C2 link quality data may be used to generate a C2 link quality model. It is noted herein that any mathematical operation(s) known in the art may be used to generate a C2 link quality model from historical C2 link quality data. For example, the C2 link quality model may be generated by taking the average and/or median values of historical C2 link quality data at a plurality of points along the planned route 103.

In some embodiments, the C2 link quality model may be generated based on historical C2 link quality data and additional data, such as predictive C2 link quality or anticipated conditions along the planned route 103. For example, as noted previously herein, historical C2 link quality data may be collected/acquired during one or more historical (previous) flights along the planned route 103. An initial C2 link quality model may be generated based on the historical C2 link quality data. Subsequently, the UAS controller 102 and/or controller 112 may be configured to selectively adjust the initial C2 link quality model based on one or more anticipated conditions for an upcoming monitored flight. Anticipated conditions may include, but are not limited to, anticipated noise/interference along the planned route 103, anticipated network traffic along the planned route 103, anticipated weather conditions along the planned route 103, anticipated terrestrial obstructions, anticipated jamming, and the like.

For instance, an initial C2 link quality model may be used as a baseline for an upcoming monitored flight of a UAV 101 along the planned route 103. Weather forecasts may anticipate weather conditions which will detrimentally affect C2 link quality during the upcoming monitored flight. In this regard, UAS controller 102 and/or controller 112 may be configured to selectively adjust the initial C2 link quality model based on the anticipated weather conditions in order to generate the C2 link quality model which will be used to predict C2 link quality during the upcoming monitored flight.

It is noted herein that C2 link quality (e.g., C2 link quality model, actual C2 link quality data) may be characterized using any values or characterization techniques known in the art. In this regard, C2 link quality may be characterized based on any number of factors including, but not limited to, received signal strength, packet loss, network delay, latency, and the like. In this regard, C2 link quality may be monitored/characterized by any link quality metrics/characteristics known in the art.

In some embodiments, the UAS controller 102 and/or the onboard controller 112 may be configured to generate one or more alerts if a planned route 103 is planned/programmed which will exceed expected C2 link coverage, as determined by the C2 link quality model. Alerts generated by the UAS controller 102 and/or controller 112 may be transmitted via the network 110, and may be displayed or otherwise conveyed to a user via any notification techniques known in the art. Alerts may include, but are not limited to, text messages, automated phone calls, emails, banners, messages via applications ("Apps"), or the like.

For example, as shown in FIG. 2A, a C2 link quality model mapping expected C2 link coverage may be generated for a geographical region covered by network 110. Subsequently, a planned route 103 for a future flight of a UAV 101 may be input into the UAS 100 (e.g., stored within memory 106, 116). In this example, the planned route 103 for the future flight may traverse one or more areas which is not expected to exhibit C2 link coverage (e.g., traverses areas outside of the C2 link quality model). In this example, the UAS controller 102 and/or controller 112 may be configured to generate one or more alerts configured to alert a user that the planned route 103 for the future flight is not expected to maintain sufficient C2 link coverage across the entirety of the planned route. By notifying a user of expected insufficient C2 link coverage, users may be able to adjust the planned route 103 and/or reevaluate characteristics of the future flight in order to ensure safe, efficient operation of the UAV 101. Accordingly, it is contemplated herein that comparing C2 link quality models and planned routes 103 prior to the flights along the planned routes may enable safer, more efficient planning decisions.

In embodiments, the UAS controller 102 and/or onboard controller 112 may be configured to generate one or more control signals configured to cause the UAV 101 to perform a monitored flight along a planned route 103. In embodiments where the UAS controller 102 is configured to generate the control signals to cause the UAV to perform the monitored flight along a planned route 103, the one or more control signals may be transmitted from the UAS controller 102 (e.g., base station 108) to the UAV 101 via the network 110. As noted previously herein, predicted/anticipated C2 link quality during the monitored route may be modeled by the C2 link quality model.

In embodiments, the UAS controller 102 and/or onboard controller 112 may be configured to acquire actual C2 link quality data during the monitored flight along the planned route 103. For example, as the UAV 101 travels along the planned route 103, the UAS controller 102 and/or controller 112 may be configured to monitor/record actual C2 link quality experienced. The UAS controller 102 and/or controller 112 may be configured to acquire actual C2 link quality data by identifying a C2 link quality metric at regular or irregular intervals during the monitored flight, and associating the identified C2 link quality metrics with the position of the UAV 101 along the planned route where each of the respective C2 link quality metrics were identified. Actual C2 link quality data may be acquired in real time or near-real time, and may be stored in memory 106, 116.

In embodiments, the UAS controller 102 and/or onboard controller 112 may be configured to compare the actual C2 link quality data to the C2 link quality model. For example, the C2 link quality model and actual C2 link quality data may both be stored in memory 106, 116. In this example, the UAS controller 102 and/or onboard controller 112 may be configured to compare the C2 link quality model and actual C2 link quality data by comparing C2 link quality values/metrics at similar locations along the planned route 103. C2 link performance may be monitored for the purpose of C2 link integrity monitoring, which may provide computing logic awareness of the current status of the C2 link connection. Accordingly, it is contemplated herein that actual C2 link quality data may be compared to the C2 link quality model in real time and/or near-real time.

For instance, the UAS controller 102 and/or onboard controller 112 may be configured to determine a first C2 link quality value ($C2_{LQ1}$) for an identified location based on the C2 link quality model, and determine a second C2 link quality value ($C2_{LQ2}$) for the identified location based on the actual C2 link quality data. By comparing the first C2 link quality value ($C2_{LQ1}$) to the second C2 link quality value ($C2_{LQ2}$), the UAS controller 102 and/or onboard controller 112 may be able to compare expected or anticipated C2 link quality (C2 link quality model) to the C2 link quality data actually experienced by the UAV 101 during the monitored flight.

In some embodiments, the UAS controller 102 and/or onboard controller 112 may be configured to selectively modify one or more characteristics of the C2 link quality model based on actual C2 link quality data acquired during the monitored flight. For example, if the actual C2 link quality data acquired during the monitored flight is better than expected, the UAS controller 102 and/or onboard controller 112 may be configured to selectively modify one or more characteristics of the C2 link quality model to reflect the improved C2 link quality experienced by the UAV 101.

In embodiments, the UAS controller 102 and/or onboard controller 112 may be configured to identify a C2 link quality deviation between the actual C2 link quality data and the C2 link quality model. For example, continuing with reference to the example above, the UAS controller 102 and/or onboard controller 112 may be configured to determine a first C2 link quality value ($C2_{LQ1}$) for an identified location based on the C2 link quality model, and determine a second C2 link quality value ($C2_{LQ2}$) for the identified location based on the actual C2 link quality data. In this example, a C2 link quality deviation ($\Delta C2_{LQ}$) may exist when the first C2 link quality value ($C2_{LQ1}$ from the C2 link quality model) is not equal to the second C2 link quality value ($C2_{LQ2}$ from the actual C2 link quality data).

In some embodiments, a C2 link quality deviation ($\Delta C2_{LQ}$) may be defined as the absolute value of the difference between the first C2 link quality value ($C2_{LQ1}$) and the second C2 link quality value ($C2_{LQ2}$) (e.g., $\Delta C2_{LQ}=|C2_{LQ2}-C2_{LQ1}|$). It is noted herein, however, that a C2 link quality deviation ($\Delta C2_{LQ}$) may be identified and/or defined using any mathematical techniques, equations, or algorithms known in the art.

In embodiments, the UAS controller 102 and/or onboard controller 112 may be configured to compare the identified C2 link quality deviation ($\Delta C2_{LQ}$) to a threshold deviation value ($C2_{thresh}$). The threshold deviation value ($C2_{thresh}$) may be characterized by any number of link connectivity metrics or characteristics known in the art including, but not limited to, received signal strength, packet loss, network delay, latency, and the like. For instance, in a simple example, the C2 link quality model and actual C2 link quality data may be characterized by received signal strength values. In this example, the threshold deviation value ($C2_{thresh}$) may include a received signal strength value such that the identified C2 link quality deviation ($\Delta C2_{LQ}$) (expressed as a received signal strength value) may be compared to the threshold deviation value ($C2_{thresh}$) (expressed as a received signal strength value).

In some embodiments, upon determining the identified C2 link quality deviation ($\Delta C2_{LQ}$), the UAS controller 102 and/or controller 112 may be configured to generate an alert configured to alert a user of the identified C2 link quality deviation ($\Delta C2_{LQ}$), It is contemplated herein that providing alerts to a user operating the UAV 101 may enable safer, more intuitive operation of the UAV 101. In particular, by receiving an alert prior to total loss of C2 connectivity, a user may be able to make decisions as to how the UAV 101 may be safely and effectively operated without losing C2 link connectivity. Alerts generated by the UAS controller 102 and/or controller 112 may be transmitted via the network 110, and may be displayed or otherwise conveyed to a user via any notification techniques known in the art. Alerts may include, but are not limited to, text messages, automated phone calls, emails, banners, messages via applications ("Apps"), or the like.

In additional and/or alternative embodiments, the UAS controller 102 and/or onboard controller 112 may be configured to adaptively modify one or more characteristics of the planned route 103 based on the identified C2 link quality deviation ($\Delta C2_{LQ}$). Characteristics of the planned route 103 may include, but are not limited to, a direction/heading along the planned route 103, an altitude of the UAV 101 along the planned route 103, a speed of the UAV 101 along the planned route 103, and the like.

If the identified C2 link quality deviation ($\Delta C2_{LQ}$) is less than the threshold deviation value ($C2_{thresh}$) (e.g., ($\Delta C2_{LQ}<C2_{thresh}$), this may indicate that the actual C2 link quality experienced by the UAV 101 is within an acceptable range from the C2 link quality model. Accordingly, the threshold deviation value ($C2_{thresh}$) may be used as a reference point to determine acceptable deviations from anticipated C2 link quality such that flight along the planned route is still safe and controlled. In this regard, the threshold deviation value ($C2_{thresh}$) may be regarded as a design choice within the UAS 100 to select tolerances for C2 link quality.

In some embodiments, the threshold deviation value ($C2_{thresh}$) may be directly proportional to the tolerance within the UAS 100. For example, increasing the threshold deviation value ($C2_{thresh}$) may increase the tolerance within the UAS 100, thereby allowing higher deviations between actual C2 link quality data and the C2 link quality model. Conversely, by way of another example, decreasing the threshold deviation value ($C2_{thresh}$) may decrease the tolerance within the UAS 100, thereby allowing lower deviations between actual C2 link quality data and the C2 link quality model. The threshold deviation value ($C2_{thresh}$) may be selectively adjusted automatically and/or manually based on preferred characteristics of the UAS 100.

In embodiments, the UAS controller 102 and/or onboard controller 112 may be configured to generate one or more control signals configured to cause the UAV 101 to perform one or more prescribed flight plan maneuvers if the identified C2 link quality deviation ($\Delta C2_{LQ}$) exceeds the threshold deviation value ($C2_{thresh}$) (e.g., $\Delta C2_{LQ} > C2_{thresh}$). Several conditions may exist which may cause an identified C2 link quality deviation ($\Delta C2_{LQ}$) to exceed the threshold deviation value ($C2_{thresh}$) ($\Delta C2_{LQ} > C2_{thresh}$). For example, conditions which may cause $\Delta C2_{LQ} > C2_{thresh}$ may include, but are not limited to, inaccurate modeling within the C2 link quality model, network faults, weather conditions, interference, jamming, high network traffic, and the like.

If it is determined that the identified C2 link quality deviation ($\Delta C2_{LQ}$) exceeds the threshold deviation value ($C2_{thresh}$) (e.g., ($\Delta C2_{LQ} > C2_{thresh}$), the UAS controller 102 and/or onboard controller 112 may be configured to determine that the actual (experienced) C2 link quality is not within the allowable tolerance for the UAS 100. This may be indicative that actual experienced C2 link quality is substantially less than what was expected according to the C2 link quality model. Accordingly, the UAS controller 102 and/or onboard controller 112 may be configured to generate one or more control signals configured to cause the UAV 101 to perform one or more prescribed flight plan maneuvers in order to prevent total loss of C2 link connectivity and ensure safe flights within the UAS 100.

For example, during a monitored flight along the planned route 103, the UAS controller 102 and/or onboard controller 112 may acquire actual C2 link quality data, and compare the actual C2 link quality data to a C2 link quality model. High data traffic, weather conditions, or some other factors experienced along the planned route 103 may result in a significantly decreased C2 link quality. In this example, the UAS controller 102 and/or onboard controller 112 may identify that a C2 link quality deviation ($\Delta C2_{LQ}$) exceeds the threshold deviation value ($C2_{thresh}$) (e.g., ($\Delta C2_{LQ} > C2_{thresh}$) Upon determining ($\Delta C2_{LQ} > C2_{thresh}$), the UAS controller 102 and/or onboard controller 112 may be configured to generate one or more control signals configured to cause the UAV 101 to perform one or more prescribed flight plan maneuvers.

In embodiments, the one or more prescribed flight plan maneuvers may be configured to prevent total loss of C2 link connectivity between the UAS controller 102 and the UAV 101. In this regard, the one or more prescribed flight plan maneuvers may be executed prior to the total loss of C2 link connectivity between the UAS controller 102 and the UAV 101. The one or more prescribed flight plan maneuvers may include any flight maneuvers known in the art including, but not limited to, a backtracking maneuver (e.g., backtrack along planned route 103), a homing maneuver (e.g., return to ground control station 108), a hover-and-hold maneuver, a climb-and-hold maneuver, and the like. Program instructions for the prescribed flight plan maneuvers may be stored in memory 106, 116.

By executing prescribed flight plan maneuvers prior to total loss of C2 link connectivity, the UAS 100 may be configured to prevent the UAV 101 from being inadvertently programmed or instructed to exceed the predicted boundaries of C2 link coverage and positive C2 control (as determined by the C2 link quality model).

In additional and/or alternative embodiments, after performing the one or more prescribed flight plan maneuvers, the UAS 100 may be configured to cause the UAV 101 to continue along the planned route 103 if C2 link quality subsequently improves to within acceptable tolerances. For example, after identifying insufficient actual C2 link quality data such that $\Delta C2_{LQ} > C2_{thresh}$, the UAS controller 102 and/or onboard controller 112 may cause the UAV 101 to perform a hover-and-hold maneuver so as to prevent total C2 link connectivity loss. Subsequently, at a time subsequent to performing the hover-and-hold maneuver, C2 link quality may improve. In this example, the UAS controller 102 and/or onboard controller 112 may determine that $\Delta C2_{LQ} < C2_{thresh}$, and that C2 link quality has improved to within acceptable tolerances. Accordingly, the UAS controller 102 and/or onboard controller 112 may then transmit one or more control signals to the UAV 101, wherein the one or more control signals are configured to cause the UAV 101 to terminate the hover-and-hold maneuver and continue along the planned route 103.

Figure 2B:
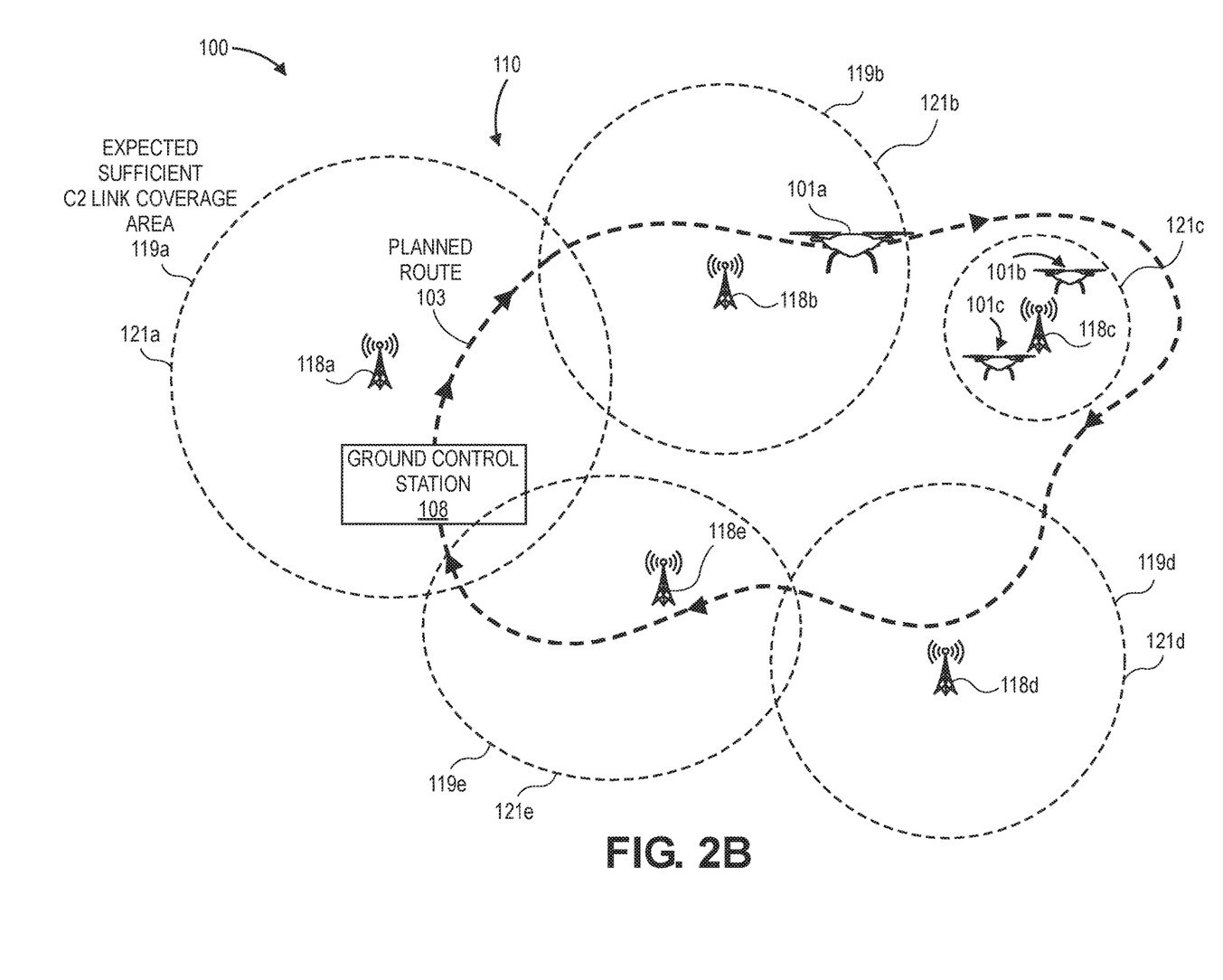
FIG. 2B illustrates a conceptual diagram of an unmanned aerial system (UAS), in accordance with one or more embodiments of the present disclosure.

FIG. 2B illustrates conceptual diagram of an unmanned aerial system (UAS), in accordance with one or more embodiments of the present disclosure. In some embodiments, the UAS 100 may include one or more UAVs 101a-101n.

It is noted herein that embodiments of the present disclosure may enable safer, coordinated UAV 101 control across a plurality of UAVs 101. In particular, embodiments of the present disclosure may enable more efficient resource management, and may provide means to selectively adjust characteristics of the UAS 100 based on resource consumption.

For example, as shown in FIG. 2B, the UAS 100 may include a plurality of UAVs 101a, 101b, 101c. Each of the UAVs 101a, 101b, 101c may be communicatively coupled to one or more UAS controllers 102. For example, a UAS controller 102 may be communicatively coupled to the UAVs 101a, 101b, 101c in order to maintain C2 link connectivity with each of the UAVs 101a, 101b, 101c. In this example, the UAV 101a may be configured to perform a monitored flight along the planned route 103. For each of the terrestrial communication nodes 118a, 118b, 118d, and 118e, the actual C2 link coverage area 121a, 121b, 121d, and 121e may substantially conform to the modeled C2 link coverage area 119a, 119b, 119d, and 119e. However, increased network traffic around terrestrial communication node 118c may cause an actual C2 link coverage area 121c to be substantially smaller than the modeled C2 link coverage area 119c. Accordingly, there may not be sufficient C2 link coverage for the entirety of the planned route 103.

Continuing with the same example, the UAS controller 102 and/or controller 112 may be configured to identifying insufficient actual C2 link quality data such that $\Delta C2_{LQ} > C2_{thresh}$ before departing the actual C2 link coverage area 121d. Accordingly, the UAS controller 102 and/or controller 112 may be configured to cause the UAV 101a to execute one or more prescribed flight plan maneuvers in order to retain C2 link connectivity prior to departing the actual C2 link coverage area 121b. In embodiments where the UAVs 101b, 101c are included within the UAS 100, the UAS controller 102 and/or controller 112 may be configured to modify one or more characteristics of the UAVs 101b, 101c in an attempt to restore sufficient C2 link connectivity along the planned route 103 of the UAV 101a.

For example, identifying insufficient actual C2 link quality data such that $\Delta C2_{LQ} > C2_{thresh}$, the UAS controller 102 and/or controller 112 may be configured to transmit one or more control signals to the UAV 101b and/or UAV 101c in response to the identified C2 link quality deviation ($\Delta C2_{LQ}$), wherein the one or more control signals are configured to cause the UAV 101b and/or UAV 101c to selectively adjust one or more characteristics of the UAV 101b and/or UAV 101c based on the identified C2 link quality deviation ($\Delta C2_{LQ}$). Characteristics of the of the UAVs 101b, 101c which may be selectively adjusted may include, but are not limited to, a position of the UAVs 101b, 101c, a planned route of the UAVs 101b, 101c, and the like. For instance, by causing the UAV 102b to move away from the terrestrial communication node 118c, the UAS 100 may be configured to reduce network traffic across the terrestrial communication node 118c in order to increase the size of the actual C2 link coverage area 121c and restore sufficient C2 link connectivity across the planned route 103.

Figure 3A:
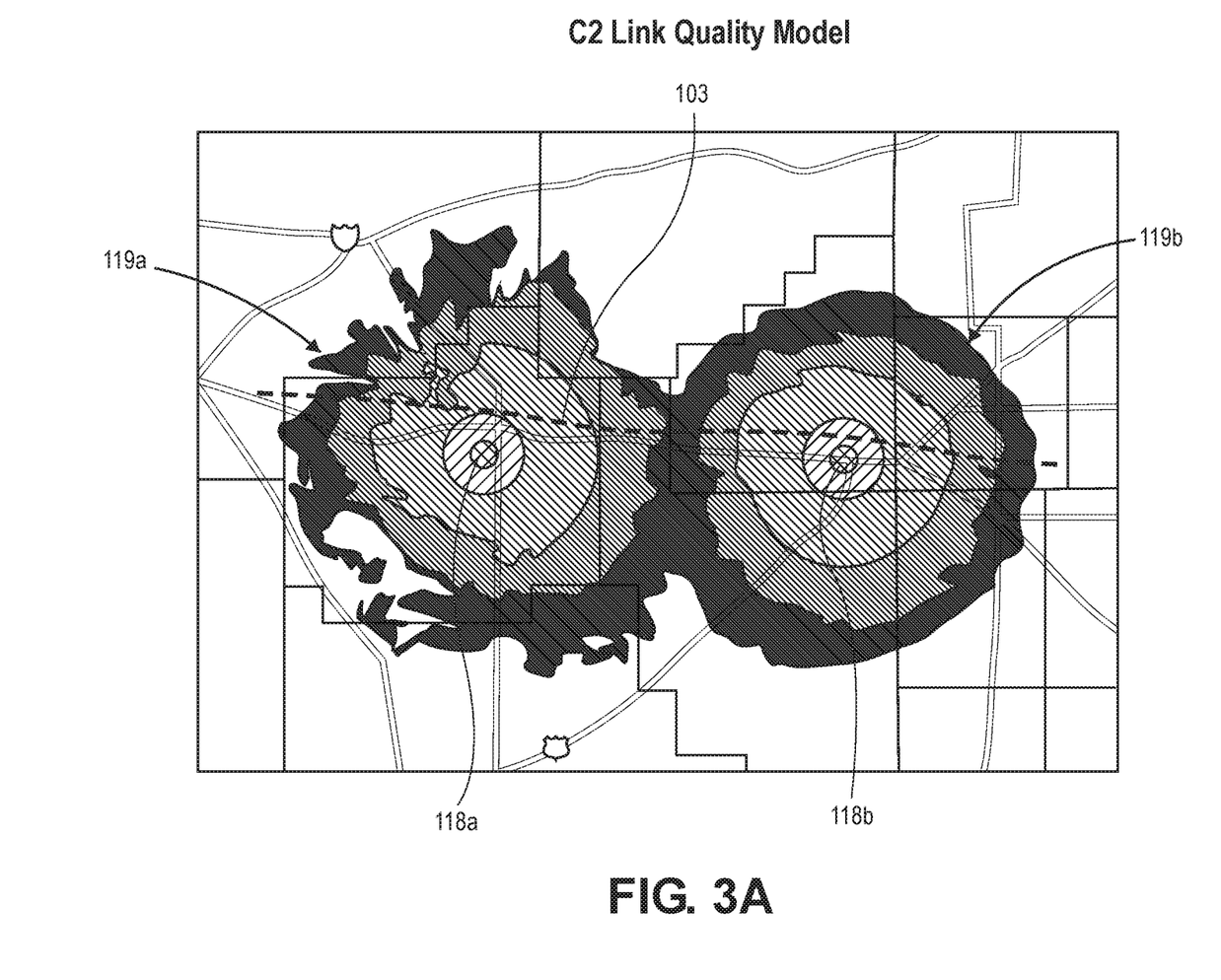
FIG. 3A is a graphical illustration of C2 link quality of an unmanned aerial system (UAS), in accordance with one or more embodiments of the present disclosure.
Figure 3B:
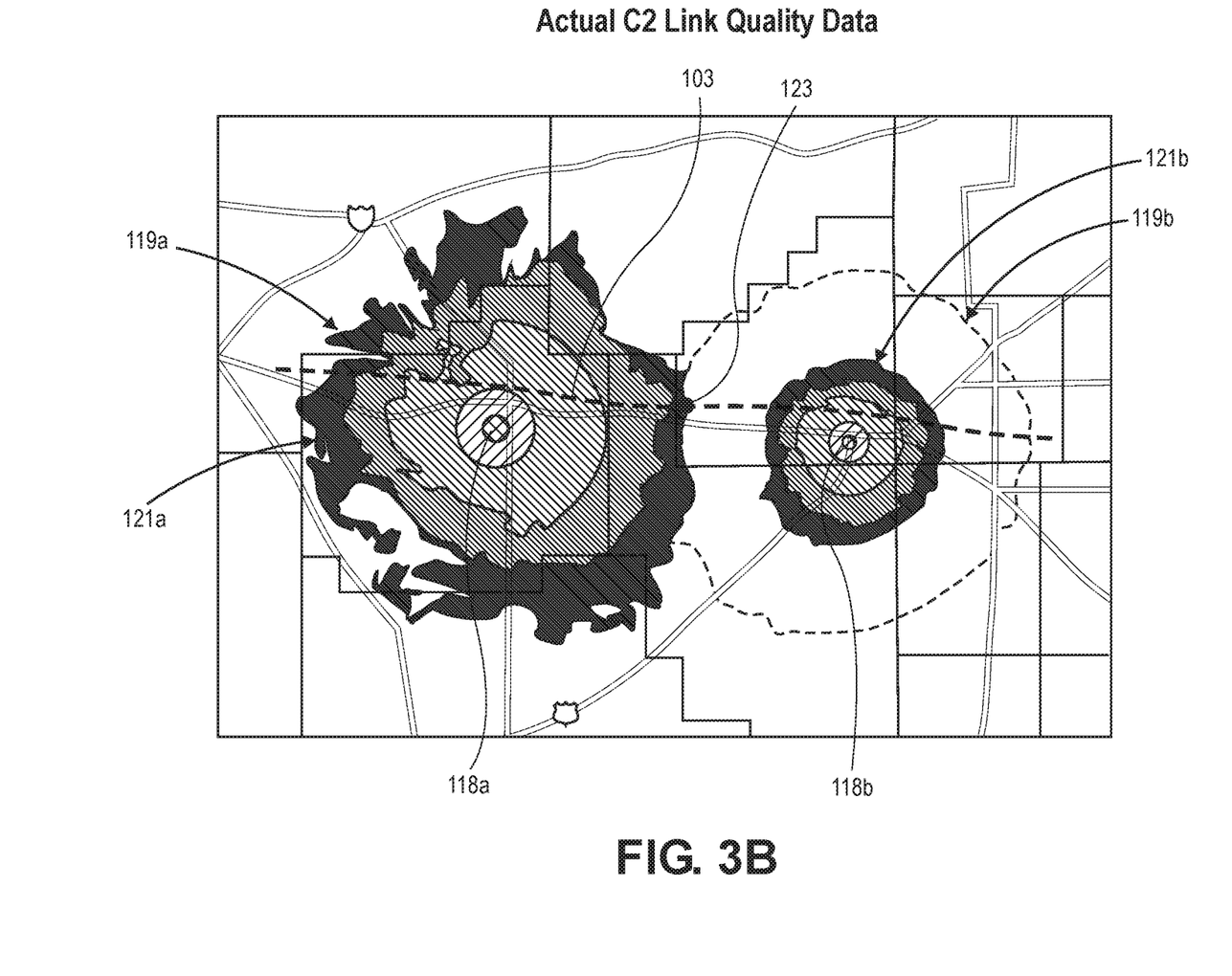
FIG. 3B is a graphical illustration of C2 link quality of an unmanned aerial system (UAS), in accordance with one or more embodiments of the present disclosure.

FIG. 3A-3B are a graphical illustrations of C2 link quality of an unmanned aerial system (UAS 100), in accordance with one or more embodiments of the present disclosure. In particular, FIG. 3A illustrates a planned route 103 traversing through modeled C2 link coverage areas 119a, 119b of a first and second terrestrial communication node 118a, 118b.

As may be seen in FIG. 3A, a modeled C2 link coverage area 119 for a planned route 103 may be made up of several individual modeled C2 link coverage areas 119a, 119b associated with individual terrestrial communication nodes 118a, 118b. Furthermore, the modeled C2 link coverage area 119 may be irregular in shape.

The modeled C2 link coverage area 119 may denote an area within which a UAV 101 is expected to maintain sufficient C2 link connectivity. However, the C2 link quality within the modeled C2 link coverage area 119 may still vary as a UAV 101 travels along the planned route 103. For example, when traveling the planned route 103 from left to right in FIG. 3A, a UAV 101 may be expected to experience high C2 link quality when flying proximate to the first terrestrial communication node 118a. Subsequently, when flying the planned route between the first and second terrestrial communication nodes 118a, 118b, the C2 link quality may be expected to decrease, and subsequently increase again when flying proximate to the first terrestrial communication node 118b. In this regard, it may be appreciated that C2 link quality may rise and fall even within a modeled C2 link coverage area 119.

In practice, actual C2 link coverage areas 121 may not exactly map to modeled C2 link coverage areas 119. Conditions which may cause an actual C2 link coverage area 121 to differ from a modeled C2 link coverage areas 119 may include, but are not limited to, inaccurate modeling within the C2 link quality model, network faults, weather conditions, interference, jamming, high network traffic, and the like. For example, as shown in FIG. 3B, weather conditions, network traffic, or the like, may cause the actual C2 link coverage area 121b to be substantially smaller than the modeled C2 link coverage area 119b. In this example, the UAS controller 102 and/or controller 112 may be configured to determine that less than expected C2 link quality values, and cause a UAV 101 flying along the planned route 103 to perform one or more prescribed flight plan maneuvers in order to prevent total C2 link connectivity loss. For instance, the UAS controller 102 and/or controller 112 may be configured to cause a UAV 101 flying along the planned route 103 to perform one or more prescribed flight plan maneuvers proximate to point 123, prior to leaving the actual C2 link coverage area 121a.

It is contemplated herein that C2 link models and/or C2 link coverage areas may be applied to a plurality of UAVs 101, a range of planned routes 103, and the like. However, it is further noted herein that hardware and performance variabilities may result in increased differences between C2 link coverage areas 121 may not exactly map to modeled C2 link coverage areas 119. In this regard, in order to provide the most accurate models, it is contemplated herein that C2 link models and/or C2 link coverage areas 119 may be generated for a specific platform. In particular, a C2 link model and/or C2 link coverage area 119 may be generated for a specific UAV 101 flying a specific planned route 103 using a specific network 110. By generating the C2 link model and/or C2 link coverage area 119 based on platform-specific models and components, it may be ensured that the C2 link model and/or C2 link coverage area 119 may be as accurate and precise as possible.

It is contemplated herein that embodiments of the present disclosure may enable safer, more responsible beyond visual line of sight (BVLOS) operations of UAVs 101. In particular, the UAS 100 of the present disclosure may prevent UAVs 101 from exceeding boundaries of positive C2 control. By preventing C2 link loss, embodiments of the present disclosure may enable more sophisticated, safe, and reliable unmanned aerial systems. It is contemplated herein that the UAS 100 of the present disclosure may provide a robust, controlled safety net for future UAS flight authorization.

In one embodiment, the one or more processors 104, 114 may include any one or more processing elements known in the art. In this sense, the one or more processors 104, 114 may include any microprocessor-type device configured to execute software algorithms and/or instructions. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 104, 114. In general, the term "processor" may be broadly defined to encompass any device having one or more processing elements, which execute program instructions from memory 106, 116. Moreover, different subsystems of the UAS 100 (e.g., UAS controller 102, controller 112) may include processor or logic elements suitable for carrying out at least a portion of the steps described throughout the present disclosure. Therefore, the above description should not be interpreted as a limitation on the present disclosure but merely an illustration.

The memory 106, 116 may include any storage medium known in the art suitable for storing program instructions executable by the associated one or more processors 104, 114 and the data generated/received by UAS 100. For example, the memory 106, 116 may include a non-transitory memory medium. For instance, the memory 106, 116 may include, but is not limited to, a read-only memory (ROM), a random-access memory (RAM), a magnetic or optical memory device (e.g., disk), a magnetic tape, a solid-state drive and the like. In another embodiment, the memory 106, 116 is configured to store data including, but not limited to, C2 link quality models, acquired actual C2 link quality data, and the like. It is further noted that memory 106, 116 may be housed in a common controller housing with the one or more processors 104, 114. In an alternative embodiment, the memory 106, 116 may be located remotely with respect to the physical location of the processors 104, 114, UAS controller 102, controller 112, and the like. In another embodiment, the memory 106, 116 maintains program instructions for causing the one or more processors 104, 114 to carry out the various steps described through the present disclosure.

Figure 4:
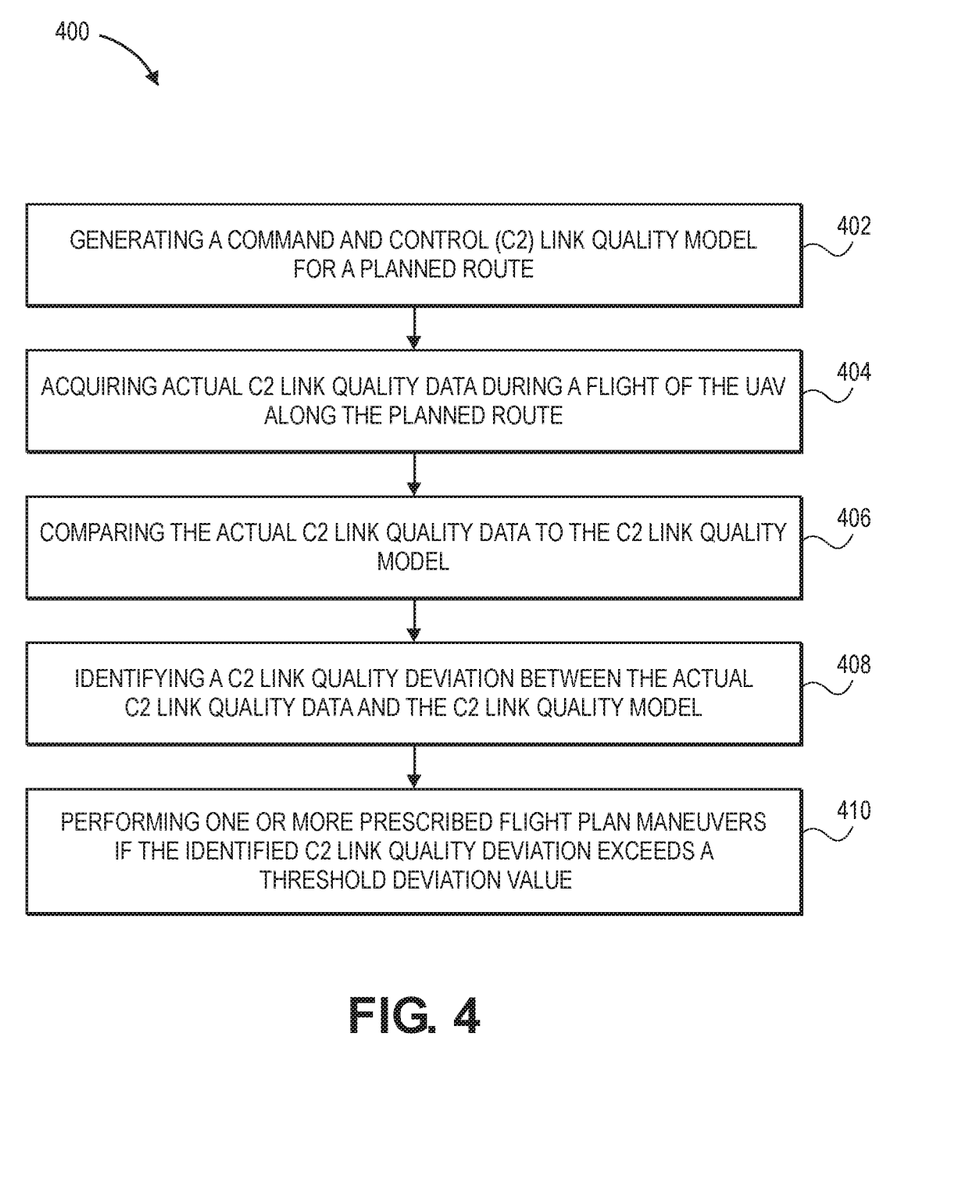
FIG. 4 illustrates a flowchart of a method for operating an unmanned aerial vehicle (UAV), in accordance with one or more embodiments of the present disclosure.

FIG. 4 illustrates a flowchart of a method 400 for operating an unmanned aerial vehicle (UAV 101), in accordance with one or more embodiments of the present disclosure. It is noted herein that the steps of method 400 may be implemented all or in part by UAS 100. It is further recognized, however, that the method 400 is not limited to the UAS 100 in that additional or alternative system-level embodiments may carry out all or part of the steps of method 400.

In a step 402, a command and control (C2) link quality model is generated for a planned route and/or a geographical region. For example, as shown in FIG. 2A, a C2 link quality model may be generated for a planned route 103. By way of another example, a C2 link quality model may be generated for a geographical region. The C2 link quality model may include a modeled C2 link coverage area 119. A C2 link quality model may include any model known in the art which is configured to map anticipated C2 link quality metrics (e.g., values) with associated positions along a planned route 103. In this regard, the C2 link quality model may include a map, chart, database, or the like, which correlates points along the planned route 103 to C2 link quality values/metrics which are expected to be experienced by a UAV 101 at the respective points along the planned route 101.

In a step 404, actual C2 link quality data is acquired during a monitored flight of the UAV along the planned route. For example, as a UAV 101 travels along the planned route 103, the UAS controller 102 and/or controller 112 may monitor and acquire actual C2 link quality data experienced by the UAV 101. Actual C2 link quality data may be acquired in real time or near-real time.

In a step 406, the actual C2 link quality data is compared to the C2 link quality model. For example, the C2 link quality model and actual C2 link quality data may both be stored in memory 106, 116. In this example, the UAS controller 102 and/or onboard controller 112 may be configured to compare the C2 link quality model and actual C2 link quality data by comparing C2 link quality values/metrics at similar locations along the planned route 103. C2 link performance may be monitored for the purpose of C2 link integrity monitoring, which may provide computing logic awareness of the current status of the C2 link connection.

In a step 408, a C2 link quality deviation between the actual C2 link quality data and the C2 link quality model is identified. For example, the UAS controller 102 and/or onboard controller 112 may be configured to determine a first C2 link quality value ($C2_{LQ1}$) for an identified location based on the C2 link quality model, and determine a second C2 link quality value ($C2_{LQ2}$) for the identified location based on the actual C2 link quality data. In this example, a C2 link quality deviation may exist when the first C2 link quality value ($C2_{LQ1}$ from the C2 link quality model) and the second C2 link quality value ($C2_{LQ2}$ from the actual C2 link quality data) are not equal. In this regard, a C2 link quality deviation ($\Delta C2_{LQ}$) may be defined as the absolute value of the difference between the first C2 link quality value ($C2_{LQ1}$) and the second C2 link quality value ($C2_{LQ2}$) (e.g., $\Delta C2_{LQ} = |C2_{LQ2} - C2_{LQ1}|$). It is noted herein, however, that a C2 link quality deviation ($\Delta C2_{LQ}$) may be identified and/or defined using any mathematical techniques, equations, or algorithms known in the art.

In a step 410, one or more prescribed flight plan maneuvers are performed if the identified C2 link quality deviation exceeds a threshold deviation value (e.g., $\Delta C2_{LQ} > C2_{thresh}$). For example, during a monitored flight along the planned route 103, the UAS controller 102 and/or onboard controller 112 may acquire actual C2 link quality data, and compare the actual C2 link quality data to a C2 link quality model. In this example, the UAS controller 102 and/or onboard controller 112 may identify that a C2 link quality deviation ($\Delta C2_{LQ}$) exceeds the threshold deviation value ($C2_{thresh}$) (e.g., $\Delta C2_{LQ} > C2_{thresh}$). Upon determining ($\Delta C2_{LQ} > C2_{thresh}$), the UAS controller 102 and/or onboard controller 112 may be configured to generate one or more control signals configured to cause the UAV 101 to perform one or more prescribed flight plan maneuvers.

In embodiments, the one or more prescribed flight plan maneuvers may be configured to prevent total loss of C2 link connectivity between the UAS controller 102 and the UAV 101. In this regard, the one or more prescribed flight plan maneuvers may be executed prior to the total loss of C2 link connectivity between the UAS controller 102 and the UAV 101. The one or more prescribed flight plan maneuvers may include any flight maneuvers known in the art including, but not limited to, a backtracking maneuver (e.g., backtrack along planned route 103), a homing maneuver (e.g., return to ground control station 108), a hover-and-hold maneuver, a climb-and-hold maneuver, and the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:
1. An unmanned aerial system (UAS), comprising:
an unmanned aerial vehicle (UAV);
and
a controller communicatively coupled to the UAV, the controller including one or more processors configured to execute a set of program instructions stored in memory, the set of program instructions configured to cause the one or more processors to:
acquire a command and control (C2) link quality model for a planned route of a geographical region, the C2 link quality model based on at least an anticipated network traffic along the planned route;

generate one or more control signals configured to cause the UAV to perform a monitored flight along the planned route;

acquire actual C2 link quality data during the monitored flight along the planned route, the actual C2 link quality data being characterized based on at least actual network traffic along the planned route;

compare the actual C2 link quality data to the C2 link quality model;

identify a C2 link quality deviation between the actual C2 link quality and the C2 link quality model, the C2 link quality deviation being based on at least the anticipated network traffic along the planned route; and generate one or more control signals configured to cause the UAV to perform one or more prescribed flight plan maneuvers if the identified C2 link quality deviation ($\Delta C2_{LQ}$) exceeds a threshold deviation value ($C2_{thresh}$).

2. The unmanned aerial system of claim 1, wherein the controller is positioned onboard the UAV.

3. The unmanned aerial system of claim 1, wherein the controller comprises a remote UAS controller wirelessly coupled to the UAV.

4. The unmanned aerial system of claim 1, wherein the one or more prescribed flight plan maneuvers are performed in order to prevent total loss of C2 link connectivity between the UAV and the UAS controller.

5. The unmanned aerial system of claim 1, wherein the C2 link quality model comprises a plurality of anticipated C2 link quality metrics associated with a plurality of positions along the planned route.

6. The unmanned aerial system of claim 1, wherein acquiring a command and control (C2) link quality model for a planned route comprises:

generating the C2 link quality model based on historical C2 link quality data along the planned route.

7. The unmanned aerial system of claim 6, wherein acquiring a C2 link quality model based on historical C2 link quality data along the planned route comprises:

performing one or more flights along the planned route;

acquiring actual C2 link quality data during the one or more flights along the planned route; and generating the C2 link quality model based on the acquired actual C2 link quality data.

8. The unmanned aerial system of claim 6, wherein acquiring a C2 link quality model for a planned route further comprises:

collecting the historical C2 link quality data along the planned route;

generating an initial C2 link quality model based on the historical C2 link quality data; and selectively adjusting the initial C2 link quality model based on one or more anticipated conditions during the monitored flight to generate the C2 link quality model, wherein the one or more anticipated conditions comprise at least one of noise along the planned route, traffic along the planned route, or weather conditions along the planned route.

9. The unmanned aerial system of claim 1, wherein controller is further configured to:

generate one or more alerts if the planned route exceeds expected C2 link coverage determined by the C2 link quality model.

10. The unmanned aerial system of claim 9, wherein the one or more prescribed flight plan maneuvers comprises a hover-and-hold maneuver, wherein the UAS controller is further configured to:

determine, at a time subsequent to performing the hover-and-hold maneuver, that the identified C2 link quality deviation ($\Delta C2_{LQ}$) is less than the threshold deviation value ($C2_{thresh}$); and transmit one or more control signals to the UAV, the one or more control signals configured to cause the UAV to terminate the hover-and-hold maneuver and continue along the planned route.

11. The unmanned aerial system of claim 1, wherein the UAS controller is further configured to:

adaptively modify one or more characteristics of the planned route based on the identified C2 link quality deviation ($\Delta C2_{LQ}$).

12. The unmanned aerial system of claim 1, further comprising at least one additional UAV communicatively coupled to the UAS controller.

13. The unmanned aerial system of claim 12, wherein the UAS controller is further configured to:

transmit one or more control signals to the at least one additional UAV in response to the identified C2 link quality deviation ($\Delta C2_{LQ}$), wherein the one or more control signals are configured to cause the at least one additional UAV to selectively adjust one or more characteristics of the at least one additional UAV based on the identified C2 link quality deviation ($\Delta C2_{LQ}$).

14. The unmanned aerial system of claim 13, wherein the one or more characteristics of the at least one additional UAV comprise at least one of a position of the at least one additional UAV or a planned route of the at least one additional UAV.

15. A method of operating an unmanned aerial vehicle (UAV) using anticipated network traffic, the method comprising:

generating a command and control (C2) link quality model for a planned route, the C2 link quality model based on at least the anticipated network traffic along the planned route;

acquiring actual C2 link quality data during a monitored flight of the UAV along the planned route, the actual C2 link quality data being characterized based on at least actual network traffic along the planned route;

comparing the actual C2 link quality data to the C2 link quality model;

identifying a C2 link quality deviation ($\Delta C2_{LQ}$) between the actual C2 link quality data and the C2 link quality model, the C2 link quality deviation ($\Delta C2_{LQ}$) being based on at least the anticipated network traffic along the planned route; and performing one or more prescribed flight plan maneuvers if the identified C2 link quality deviation ($\Delta C2_{LQ}$) exceeds a threshold deviation value ($C2_{thresh}$).

* * * * *